United States Patent [19]

Cooper, Jr. et al.

[11] 4,158,605
[45] Jun. 19, 1979

[54] NUCLEAR CORE BAFFLING APPARATUS

[75] Inventors: Frank W. Cooper, Jr., Monroeville; Bernard L. Silverblatt, Pittsburgh, both of Pa.; Charles B. Knight; Robert T. Berringer, both of Gulf Breeze, Fla.

[73] Assignee: Westinghouse Electric Corp., Pittsburgh, Pa.

[21] Appl. No.: 635,023

[22] Filed: Nov. 25, 1975

[51] Int. Cl.² ............................................. G21C 9/00
[52] U.S. Cl. ..................................... 176/61; 176/65; 176/87
[58] Field of Search ..................... 176/37, 38, 50, 61, 176/67

[56] References Cited

U.S. PATENT DOCUMENTS

| 3,720,581 | 3/1973 | Kaser | 176/87 |
| 3,868,302 | 2/1975 | Singleton | 176/87 |

FOREIGN PATENT DOCUMENTS 1271594  4/1972  United Kingdom ................ 176/87

Primary Examiner—Samuel W. Engle
Assistant Examiner—Ralph Palo
Attorney, Agent, or Firm—Edward L. Levine; Z. L. Dermer

[57] ABSTRACT

Apparatus for baffling the flow of reactor coolant fluid into and about the core of a nuclear reactor. The apparatus includes a plurality of longitudinally aligned baffle plates with mating surfaces that allow longitudinal growth with temperature increases while alleviating both leakage through the aligned plates and stresses on the components supporting the plates.

11 Claims, 10 Drawing Figures

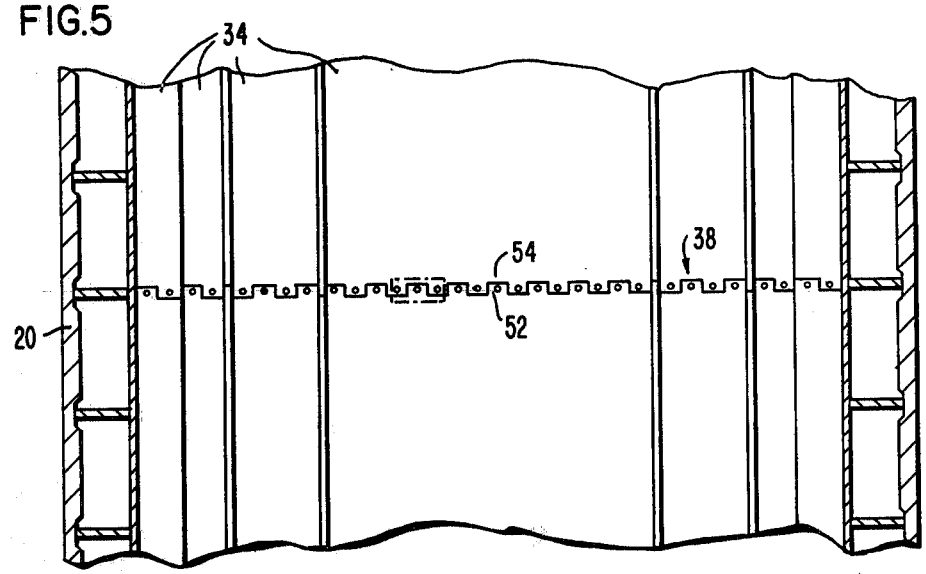
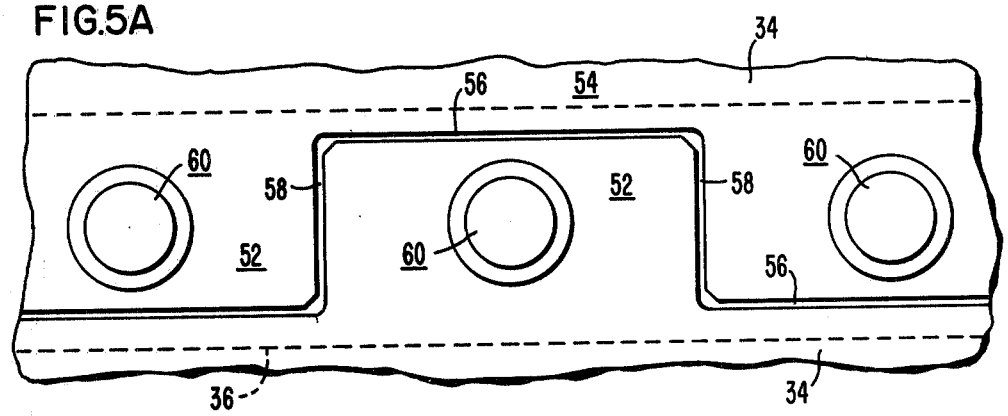
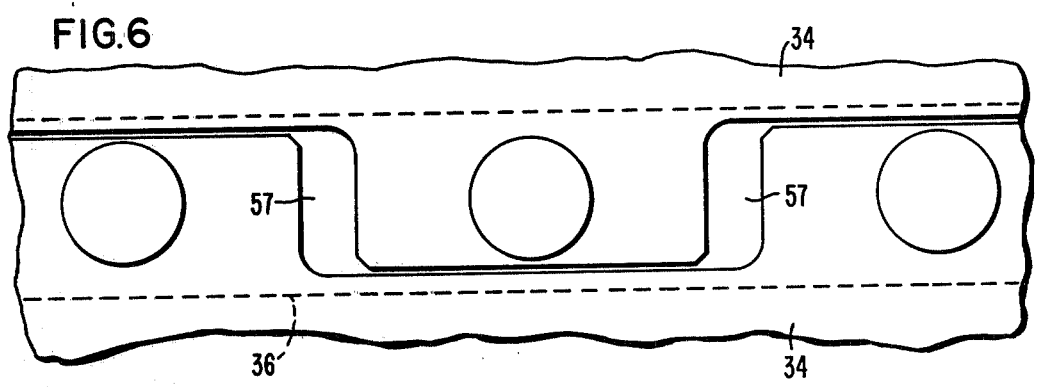

NUCLEAR CORE BAFFLING APPARATUS

CROSS-REFERENCE TO RELATED APPLICATIONS

Reference is made to the following applications, assigned to the Westinghouse Electric Corporation and filed concurrently herewith:

1. Application filed in the name of R. T. Berringer and O. J. Machado entitled "Nuclear Core Region Fastener Arrangement", Ser. No. 635,024, herein referred to as the first Berringer/Machado application. The first Berringer/Machado application may be referred to for a more complete understanding of the thermally induced stresses imposed upon core region baffling components and fasteners. This invention may be utilized in conjunction with the invention of the first Berringer/Machado application.

2. Application filed in the name of R. T. Berringer and O. J. Machado entitled "Baffle-Former Arrangement For Nuclear Reactor Vessel Internals", Ser. No. 635,025, herein referred to as the second Berringer/Machado application. The second Berringer/Machado application may be referred to for a better understanding of the functions and operating limitations of a baffling arrangement for a nuclear reactor. This invention may be utilized in conjunction with the inventive teachings of the second Berringer/Machado application.

3. Application filed in the name of R. T. Berringer entitled "Nuclear Reactor Core Flow Baffling", Ser. No. 635,026, herein referred to as the Berringer application. The Berringer application may be referred to for a better understanding of flow patterns through and about a nuclear reactor core. This invention provides an alternative baffling arrangement to the inventive arrangement of the Berringer application.

BACKGROUND OF THE INVENTION

1. Field of the Invention

This invention relates to nuclear reactors, and more particularly to reactor internals apparatus for baffling reactor coolant flow into and about the reactor core.

2. Description of the Prior Art

A typical nuclear reactor core includes a plurality of fuel assemblies positioned adjacent one another so as to approach the configuration of a right circular cylinder. The core typically seats upon and is supported by a lower core plate which in turn is supported by a flow control and support structure, such as a core barrel surrounding the core radial periphery. As the core barrel must support this large load, it is a relatively thick-walled massive structure. The core barrel, however, must be spaced from the peripheral core assemblies to alleviate the effects of irradiation upon the barrel wall. Also, cool reactor coolant entering the vessel passes about the outer surface of the core while the coolant passing through the core is hotter. Therefore, spacing the barrel from the core also protects the barrel wall from an excessive thermal gradient. It is, however, undesirable to allow a large flow of coolant to bypass the core in the area between the barrel and core, as the bypass flow detracts from the reactor thermal efficiency.

A baffle plates and formers assembly has therefore been utilized to baffle flow into and immediately about the core, while also providing an acceptable bypass coolant flow. This assembly has included a plurality of longitudinally positioned baffle plates each extending throughout the core height, and abutting against one another about the core periphery. The baffle plates are affixed to and supported by transversely positioned formers, which are supported by the core barrel. The barrel, baffle plates, and formers are affixed by fasteners, such as welds or, more typically, bolts. Because the barrel is relatively thick walled, and the baffle is relatively thin walled, they experience a thermal expansion differential that must be accommodated by the fastening means affixing the barrel, baffle plates, and formers, such as the bolts. With increased reactor core lengths, the differential expansion and resulting loads are increased even more. The resulting loads on the fasteners are significant, and can potentially result in failure. Also, the differential expansion can cause bending of the baffle plates, resulting in potential interference with the fuel assemblies and undesirable changes in the coolant flow. Particularly, enlarged gaps may occur between adjacent baffle plates, allowing cross flows which detrimentally vibrate the fuel assemblies.

It is therefore desirable to provide a baffle arrangement which not only baffles coolant flow into and about the core and provides cooling of the baffle and support components, but which also alleviates the large stresses and loads imposed upon the components and the fasteners affixing these components.

SUMMARY OF THE INVENTION

This invention provides core baffling apparatus which overcomes the above discussed deficiencies of the prior art. It includes utilization of the structure surrounding the core radial periphery, such as a core barrel. It further includes a plurality of longitudinally aligned baffle plates spaced closely adjacent the core periphery within the surrounding structure which are positioned to present a substantial barrier to flow of reactor coolant through the plates and minimal resistance to longitudinal thermal expansion. The baffle plates are affixed to the surrounding structure through means such as formers and fasteners such as bolts which, due to the plurality of aligned baffle plates, are stressed less than prior art arrangements. In the regions where the baffle plates are longitudinally aligned they can be provided with mating extensions and longitudinal clearances that allow longitudinal growth without significant interference. The plates can also be oriented with a small transverse clearance or a sliding interference fit to minimize leakage at the mating region. Further, the mating region may be aligned with the means of attachment, such as the formers, to present an even greater barrier to leakage across the plates.

BRIEF DESCRIPTION OF THE DRAWINGS

The functions and advantages of this invention will become more apparent from the following description taken in connection with the accompanying drawings, in which:

FIG. 5 is a view, similar to FIG. 2, showing another alternative embodiment;

FIG. 5a is a blow-up view of the area within the dot-dash notation of FIG. 5;

FIG. 6 is a view, similar to FIG. 5a, showing an alternative embodiment;

DESCRIPTION OF THE PREFERRED EMBODIMENT

Figure 1:
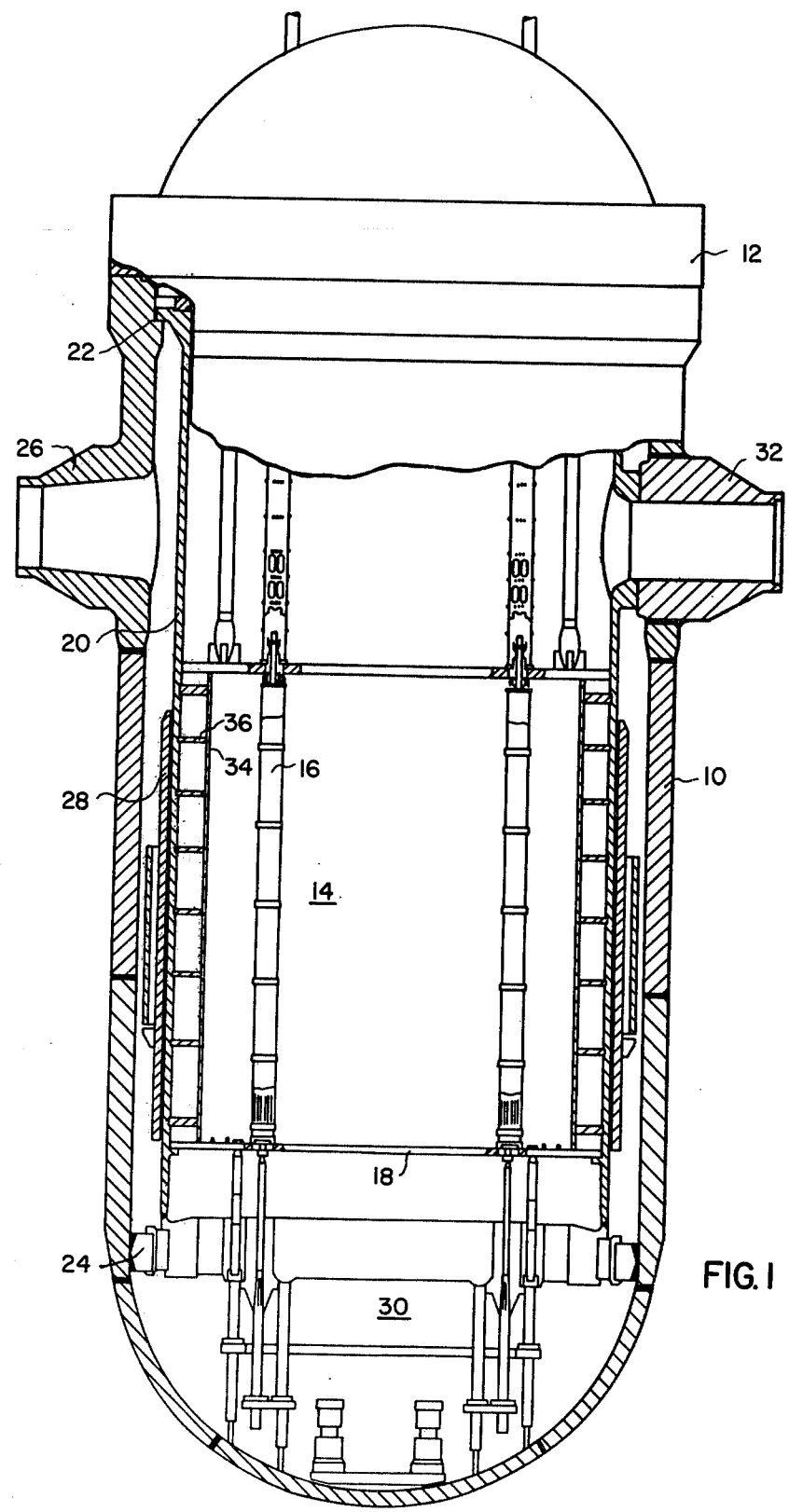
FIG. 1 is an elevation view, partially in cross-section, of a typical nuclear reactor vessel and the vessel internals.

Referring now to the drawings, there is shown in FIG. 1 a typical nuclear reactor vessel 10 including the vessel head 12. The vessel 10 encloses a reactor core 14 which includes a plurality of elongated fuel assemblies 16 oriented adjacent one another. The assemblies 16 are supported by a lower core plate 18 which is perforated to allow passage of coolant and which in turn is supported by a core barrel 20. The core barrel 20 is supported from a ledge 22 of the reactor vessel 10, and is restrained in lateral movement by a radial support system 24 affixed to the vessel 10. The main flow of reactor coolant fluid typically enters the vessel 10 through one or more inlet nozzles 26, passes downward about the outer periphery of the core barrel 20 and about the affixed neutron shields 28, is turned one hundred and eighty degrees in a lower plenum 30, passes upward through the lower core plate 18 and core 14, and exits through outlet nozzles 32.

It is of prime importance that the flow of coolant is carefully controlled into and about the fuel assemblies 16 of the core 14. Baffling of coolant flow about the core 14 has typically been performed by a baffle plates 34 and formers 36 assembly, through which a small bypass flow of reactor coolant is also passed. This bypass flow must be minimized since it decreases the thermal efficiency of the reactor, but must be large enough to adequately cool the surrounding components. In order to also minimize bypass flow between the outermost fuel assemblies 16, which are typically operating at a lower power density than more central assemblies, and the baffle plates 34, the baffle plates 34 are oriented close to the assemblies 16.

Figure 3:
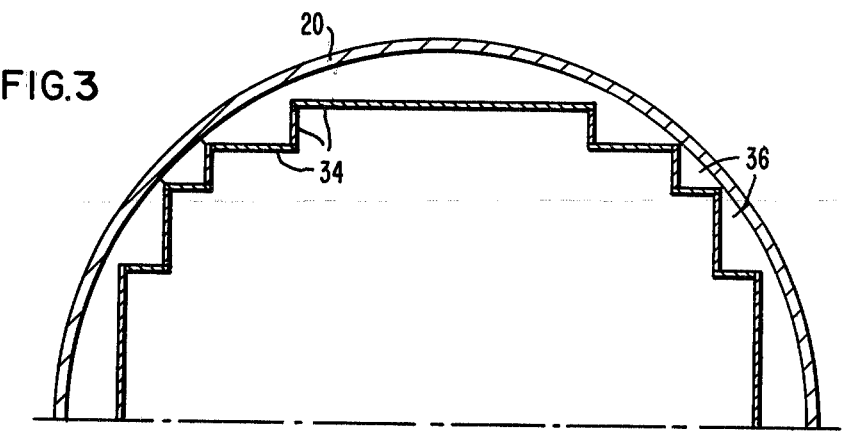
FIG. 3 is a view taken at III-III of FIG. 2.
Figure 2:
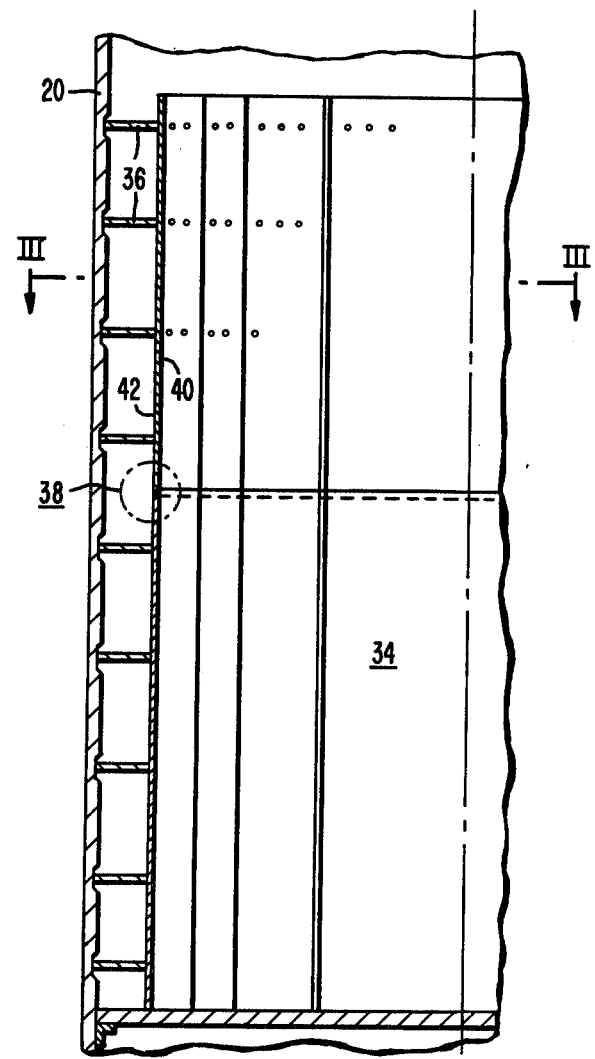
FIG. 2 is an elevation view, in cross-section, of a portion of a reactor lower internals incorporating this invention.

Because the baffle plates 34, shown best in FIGS. 2 and 3, are typically significantly thinner than the core barrel 20, the differential thermal expansion between them must be accommodated in the means fastening the formers 36 to the barrel 20 and to the baffle plates 34, typically bolts. The differential thermal expansion is compounded not only by the fact that the baffles 34 are closer to the core 14 and the hotter coolant fluid than the core barrel 20, but also because the heat generation in these components changes throughout the reactor operating cycle.

Figure 2A:
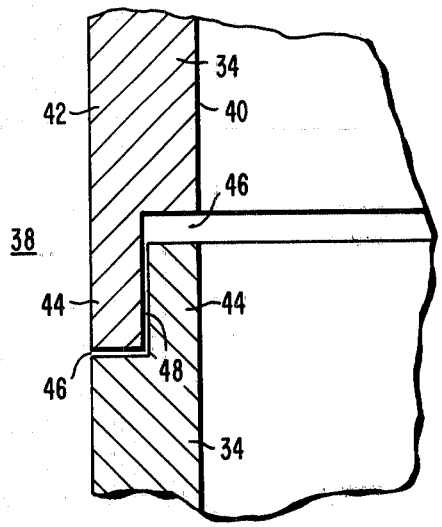
FIG. 2a is a blow-up view of the area within the dot-dash notation of FIG. 2.

Excessive fastener loads are alleviated by this invention, the pasic principle of which is to split the baffle plates 34 transversely at one or more elevations and allow expansion without significant interference at the junction region 38, thereby reducing loadings on the fasteners. To minimally disturb the coolant flow on either side of the baffle plates 34, the upper and lower plates 34 at each junction region 38 should be aligned longitudinally, to present a substantially continuous inner surface 40 and outer surface 42, as shown in FIG. 2a. Further, to minimize any cross flow leakage across the baffle plates 34 at the junction region 38, the baffle plates preferably overlap so as to provide a barrier of high resistance to flow. Both of these features can be accomplished by utilization of baffle plate extensions 44, as shown in FIG. 2a. The longitudinal clearances 46 accommodate the longitudinal expansion of the plates 34, and the transverse clearance 48 present a barrier to coolant flow.

The transverse clearances 48 should therefore be sized as small as possible consistent with manufacturing techniques and maintenance of a generally smooth inner surface 40 and outer surface 42 throughout the entire height of the baffle assembly. For the embodiment shown, a transverse clearance 48 of 0.020 inches is consistent with these criteria. The longitudinal clearances 46 should be sized to accommodate, without significant interference, the expansions of consecutive plates 34. They will therefore vary dependent upon such parameters as the lengths of the baffle plates 34 and the temperatures the plates 34 are exposed to. In the embodiment shown in FIG. 2a, the upper longitudinal clearance is 0.120 inches, and the lower is 0.060 inches. The extensions 44 are approximately one inch long.

Figure 4:
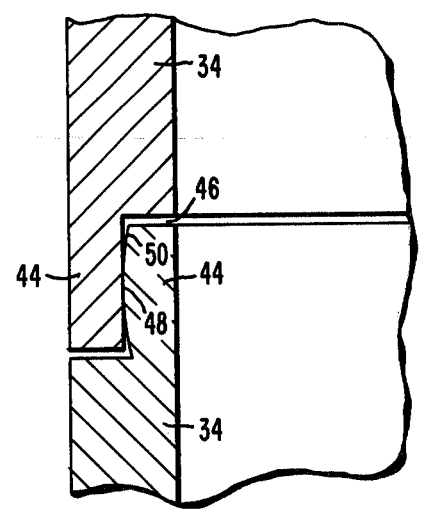
FIG. 4 is a view, similar to FIG. 2a, showing an alternative embodiment.

FIG. 4 shows another embodiment which will maintain a zero transverse clearance 48. This is accomplished by providing a curved edge 50 on at least one of the extensions 44. As consecutive baffle plates 34 expand, the curved edge 50 will maintain contact with its mating extension 44, without presenting excessive resistance to the movement.

Figure 7:
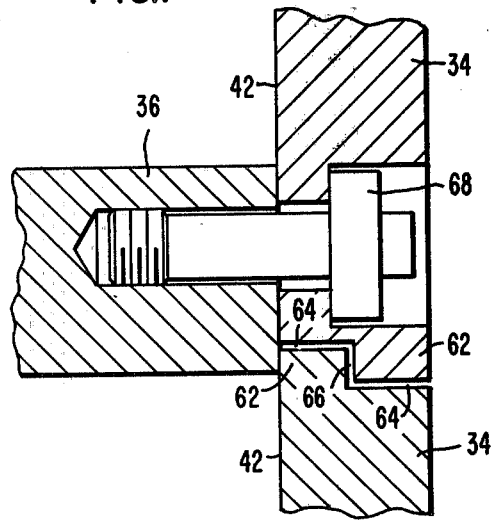
FIG. 7 is an elevation view of the embodiment of FIG. 5, showing additional detail.

FIGS. 5 through 7 present alternative embodiments which will also function to control thermal expansion and reduce fastener stresses without allowing excessive cross flow through the baffle plates at the junction regions 38. In FIGS. 5 and 5a consecutive baffle plates 34 are provided with male 52 and female 54 mating surfaces. The surfaces 52, 54 will allow longitudinal thermal expansions without interference, the expansions being taken within the longitudinal clearance 56. The male 52 and female 54 surfaces should therefore be sized to accept the expansion. The transverse clearances 58 should be sized to minimize the clearance area, without providing a significant resistance to the expansion movement. In this configuration, however, the clearances 56, 58 would allow cross flow through the junction region 38 unless otherwise prevented. Cross flow is therefore minimized by positioning the formers 36 to extend over the clearances. The formers 36 are preferably affixed to the baffles 34 by fasteners, such as bolts 60, through the male surface 52.

FIG. 6 is an embodiment similar to that of FIG. 5a. Here, however, the transverse clearances 57 are enlarged to better facilitate attachment of the mating baffle plates 34 and increase some of the manufacturing tolerances. Here, the formers 36 are positioned to extend over the clearances.

FIG. 7 shows another embodiment, similar to those of FIGS. 2a and 4, which also utilizes the formers 36 to minimize leakage across the baffle plates 34. The baffle plates 34 are provided with extensions 62 that can expand into the longitudinal clearances 64. The transverse clearance 66 is made as small as possible consistent with manufacturing techniques. Any leakage across the baffle plates 36 will therefore be minimized. To further alleviate leakage, the longitudinal clearances 64 on the baffle outer surface 42 are aligned with the formers 36. Aligning the longitudinal clearances 64 above or below the respective former 36 transverse centerline allows sufficient surface to affix the baffle 34 and former 36 by fastening means such as a bolt 68.

Figure 8:
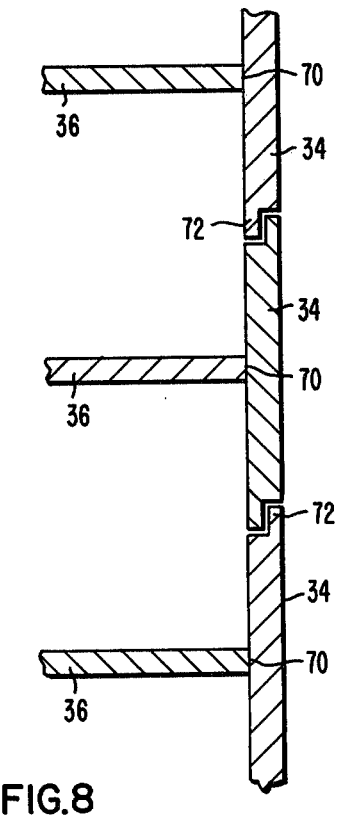
FIG. 8 is an elevation view showing yet another inventive embodiment.

Yet another embodiment is shown in FIG. 8. Here, a mating baffle plate is affixed to each former 36. Each baffle plate 34 is permitted to freely expand with temperature increases, without interfering with adjacent baffle plates 34. Thus, no significant thermally induced stresses will be imposed at the baffle-former attachment points 70. The baffle plates 34 have been shown with extensions 72, although flat edged plates can be utilized if flow is otherwise properly controlled to minimize core bypass flow and avoid vibration inducing impingement upon the fuel assemblies, such as those instances where any leakage flow would be from the core 14 outward. Affixing a separate baffle plate 34 to each former 36 provides the advantage of minimizing stresses, but would be more complex to manufacture and install than the other embodiments discussed.

It is therefore seen that this invention provides a baffling arrangement which effectively baffles reactor coolant flow into and about the core of a nuclear reactor and which effectively reduces thermally induced stresses upon the baffling components. It will be apparent that many modifications and additions are possible in view of the above teachings. For example, mating baffle plates may be arranged at an angle, not necessarily presenting a horizontal upper or lower surface. Also, the number of plates may be varied, as may the geometric configuration and orientation of the mating extensions. It therefore is to be understood that within the scope of the appended claims, the invention may be practiced other than as specifically described.

We claim as our invention:

1. Apparatus for baffling flow into and about the core of a nuclear reactor comprising:
    (a) a structure spaced from and surrounding the radial periphery of said core,
    (b) a plurality of baffle plates disposed between said structure and said core, said plates being positioned closely adjacent the radial periphery of said core so as to approach the outer configuration of said core and being longitudinally aligned atop one another so as to present a substantial barrier to flow through said longitudinally aligned plates, said aligned plates further having cooperative interengaging edges at the region of alignment to form lap joints, and
    (c) means to fasten said plates to said structure.

2. Apparatus for baffling coolant flow into and about the core of a nuclear reactor, said core having a transverse outer surface and a longitudinal dimension, said apparatus comprising:
    (a) a support structure spaced from and surrounding said transverse outer surface,
    (b) a plurality of longitudinally disposed plates closely adjacent said outer surface, said plates being longitudinally aligned so as to present a substantial continuum throughout said longitudinal dimension, said aligned plates further having cooperative interengaging edges at the region of alignment to form lap joints, and
    (c) means to affix said plates to said support structure.

3. Apparatus of claim 2 wherein said plates include integral mating extensions, said extensions being oriented to provide transverse clearances and longitudinal clearances between said longitudinally aligned plates, said longitudinal clearances being sized to freely allow thermal expansion of said plates at the operating temperature of said reactor, and said transverse clearances being sized to present negligible mechanical resistance to said expansion and to minimize flow through said transverse clearances.

4. A nuclear reactor circulating a fluid reactor coolant comprising a plurality of longitudinally extending parallel fuel assemblies forming a reactor core, a support structure transversely surrounding said core, and means affixed to said support structure disposed between said support structure and said core to baffle the flow of reactor coolant fluid into and about said core, said means including a plurality of longitudinally disposed baffle plates surrounding and collectively approaching the configuration of the transverse periphery of said core, said plates being longitudinally aligned so as to present a substantial barrier to flow of coolant through said aligned plates at the region of alignment, said aligned plates further having cooperative interengaging edges at the region of alignment to form lap joints.

5. The reactor of claim 4 wherein said baffle plates are affixed to a plurality of horizontally disposed formers each in turn affixed to said support structure such that said region of alignment is positioned at the elevation of one of said formers and adjacent one end of said former.

6. A nuclear reactor circulating a liquid reactor coolant comprising a plurality of vertically extending elongated parallel fuel assemblies forming a reactor core, a support structure radially surrounding said core, a plurality of vertically disposed baffle plates surrounding and collectively approaching the configuration of the transverse periphery of said core, said plates each affixed to said support structure and being aligned one above another, and means for forming a substantial barrier to flow of coolant through said aligned plates at the region of alignment.

7. The reactor of claim 6 wherein said baffle plates comprise mating extensions integral with said plates said region of alignment.

8. The reactor of claim 7 where said mating extensions form longitudinal clearances, said longitudinal clearances being sized to allow thermal expansion of said baffle plates without longitudinal interference.

9. The reactor of claim 8 wherein one of said mating extensions between consecutive baffle plates comprises a curved surface, said curved surface contacting the other of said extensions.

10. The reactor of claim 6 wherein said baffle plates are arranged in a plurality of rows, one atop another, and wherein said baffle plates are affixed to said support structure by a plurality of horizontally disposed formers, each said former affixed at one end to a baffle plate and at the other end to said support structure, said formers further being disposed at a plurality of former elevations, and each said row being vertically sized to extend over only one of the horizontal planes at each said former elevation.

11. The reactor of claim 6 wherein said barrier means comprise formers horizontally disposed between said support structure and said baffle plates, said formers positioned at said region of alignment.

* * * * *